United States Patent
Dal

(10) Patent No.: US 10,181,812 B2
(45) Date of Patent: Jan. 15, 2019

(54) MODULAR INVERTER BAY AND CONTROL METHOD FOR SAME FOR A SET OF ELECTRIC MACHINES WITH NO POSITION SENSORS

(71) Applicant: THALES, Courbevoie (FR)

(72) Inventor: Arnaud Dal, Versailles (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/904,901

(22) PCT Filed: Jul. 24, 2014

(86) PCT No.: PCT/EP2014/065962
§ 371 (c)(1),
(2) Date: Jan. 13, 2016

(87) PCT Pub. No.: WO2015/011242
PCT Pub. Date: Jan. 29, 2015

(65) Prior Publication Data
US 2016/0149530 A1    May 26, 2016

(30) Foreign Application Priority Data

Jul. 24, 2013 (FR) .................................. 13 01765

(51) Int. Cl.
*H02P 23/12* (2006.01)
*H02P 21/13* (2006.01)
(Continued)

(52) U.S. Cl.
CPC ............. *H02P 23/12* (2013.01); *H02P 21/13* (2013.01); *H02P 21/14* (2013.01); *H02P 21/24* (2016.02);
(Continued)

(58) Field of Classification Search
CPC .......... H02P 23/12; H02P 21/24; H02P 21/13; H02P 21/14; H02P 23/14; H02P 27/06
(Continued)

(56) References Cited

U.S. PATENT DOCUMENTS 5,414,339 A * 5/1995 Masaki ................... B60L 3/003
318/139
5,881,113 A * 3/1999 Lee ........................ H04J 3/0688
327/142
(Continued)

FOREIGN PATENT DOCUMENTS

FR    2 936 380 A1    3/2010
FR    2 984 637 A1    6/2013
(Continued)

*Primary Examiner* — Kawing Chan
(74) *Attorney, Agent, or Firm* — Baker & Hostetler LLP

(57) ABSTRACT

A modular power bay for an aircraft comprises a plurality of electric machines, a plurality of inverters, and a control member configured to assign to at least one machine one or more inverters, according to the operational requirements of the plurality of machines. The control member comprises: an observer, able to measure phase currents and phase-neutral voltages of an electrical power supply signal of the machine, an estimator, able to determine a rotor position, based on the measurements of at least one observer, means for communicating, to each of the inverters: a control instruction for each of the inverters for responding to the operational requirement of said machine, measurements of at least one observer, or of the estimated rotor position.

11 Claims, 4 Drawing Sheets

(51) Int. Cl.
*H02P 21/14* (2016.01)
*H02P 23/14* (2006.01)
*H02P 21/24* (2016.01)
*H02P 27/06* (2006.01)

(52) U.S. Cl.
CPC .............. *H02P 23/14* (2013.01); *H02P 27/06* (2013.01); *B64D 2221/00* (2013.01)

(58) Field of Classification Search
USPC ................................................. 318/400.26
See application file for complete search history.

(56) References Cited

U.S. PATENT DOCUMENTS

| | | | | |
|---|---|---|---|---|
| 6,211,633 B1 * | 4/2001 | Jones | ...................... | H02P 6/185 |
| | | | | 318/400.04 |
| 6,384,567 B1 * | 5/2002 | Maeda | .................. | B60L 3/0023 |
| | | | | 318/434 |
| 2002/0063548 A1 | 5/2002 | Schwesig | | |
| 2005/0007044 A1 * | 1/2005 | Qiu | ......................... | H02P 21/13 |
| | | | | 318/400.02 |
| 2005/0146306 A1 * | 7/2005 | Ha | ........................... | H02P 21/04 |
| | | | | 318/807 |
| 2009/0058183 A1 | 3/2009 | Morris et al. | | |
| 2011/0181219 A1 | 7/2011 | Liegeois et al. | | |
| 2012/0001581 A1 * | 1/2012 | Sumita | ................ | H02P 21/0003 |
| | | | | 318/490 |
| 2012/0319625 A1 * | 12/2012 | Thomas | .................... | H02P 5/74 |
| | | | | 318/51 |
| 2013/0158808 A1 * | 6/2013 | Imamura | ................ | B62D 5/046 |
| | | | | 701/42 |

FOREIGN PATENT DOCUMENTS

| | | |
|---|---|---|
| WO | 95/17780 A1 | 6/1995 |
| WO | 2013/093223 A2 | 6/2013 |

* cited by examiner

MODULAR INVERTER BAY AND CONTROL METHOD FOR SAME FOR A SET OF ELECTRIC MACHINES WITH NO POSITION SENSORS

CROSS-REFERENCE TO RELATED APPLICATIONS

This application is a National Stage of International patent application PCT/EP2014/065962, filed on Jul. 24, 2014, which claims priority to foreign French patent application No. FR 1301765, filed on Jul. 24, 2013, the disclosures of which are incorporated by reference in their entirety.

FIELD OF THE INVENTION

The present invention relates to the field of electrical systems for the control of electric machines with which an aircraft is equipped. More specifically, it concerns a modular inverter bay and control method intended for an aircraft comprising a set of electric machines equipped with position sensors.

BACKGROUND

An aircraft generally comprises multiple electric machines distributed throughout the aircraft for fulfilling a set of diverse tasks. Known for example are electric machines dedicated to starting up a propulsion turbine, to an air conditioning system for the cabin of the aircraft, or dedicated to the operation of the flight control surfaces of the aircraft. For these tasks, DC, asynchronous, or synchronous, triphase, hexaphase or more generally, polyphase electric machines are notably used. These electric machines consume electrical power available on the onboard network of the aircraft, and for example supplied by a generator linked to a turbine or supplied by an airport network while the aircraft is on the ground.

It is known that it is essential to have reliable information on the position of the rotor of the electric machine. Any measurement error regarding the position significantly increases electrical losses. Typically, an error of less than 5% in the actual position is generally sought, the impacts on the machine being considered to be acceptable (an adverse effect on mass linked to machine oversizing, additional costs, notably for cooling, etc. . . . ). The electric machines implemented on board an aircraft exhibit high rotational speeds, of the order of 10,000 to 50,000 rpm, making it necessary to have information on the position of the high-frequency rotor, typically of the order of 8 to 40 kHz. Many techniques exist for evaluating the position of the rotor. A variety of sensors are known ensuring a physical measurement of the position, calculating means also exist allowing this position to be evaluated as a function of the voltages and currents measured in each of the phases of the machine.

In a conventional electrical architecture of an aircraft, each electric machine possesses one or more inverters linked to the onboard network which shapes the signal supplying power to each of the phases in accordance with the requirements of the machine. When the electric machine is not equipped with position sensors, a widespread conventional method implements a position estimator such as a Kalman filter. This estimator is based on phase currents flowing in the machine as well as phase-neutral voltages applied to the machine. FIG. 1 illustrates the principle of this position estimator in the case of an electric machine 11, supplied with power by a sole inverter 10. The three phase currents (in this case a triphase machine) are denoted by $i_a$, $i_b$, $i_c$; the three phase-neutral voltages are denoted by $V_a$, $V_b$, $V_c$. The three objects denoted by A correspond to three sensors respectively measuring the currents $i_a$, $i_b$, $i_c$. The voltage VDC is the input voltage of the inverter, or DC bus voltage at the input of the inverter.

By measuring the currents and voltages, the estimator allows the rotor position $\theta_0$ and the rotor rotational speed $\omega_0$ of the electric machine to be determined using a function of the type:

$$(\theta_0, \omega_0) = f(i_a, i_b, i_c, V_a, V_b, V_c)$$

Various known functions exist, using a Kalman filter or other techniques, allowing this estimation of position and speed. These known techniques are not covered again here in detail.

At this stage it is appropriate to mention that the present document only makes reference to phase currents and phase-neutral voltages, but that these generic designations refer more broadly:

for phase-neutral voltages:
  to phase-phase voltages,
  to Park transformation vd-vq voltages,
  to PWM Da, Db, Dc duty cycles,
  to PWM duty cycles after Dq-Dd Park transformation,
  or using any other transformation equivalent to a change of reference frame (for example Concordia)
for phase currents, to Park transformation id-iq currents,
  or using any other transformation equivalent to a change of reference frame, for example Concordia.

FIGS. 2a and 2b illustrate the principle of the estimation of position in the case in which an electric machine is supplied with power by multiple inverters, for example a number N of inverters. In a first known architecture, the inverters are connected in parallel by generally adding an inductance at the output of each bridge leg of the inverters, or the inverters can be coupled by a coupling inductor as shown in FIG. 2a. As previously, $i_a$, $i_b$, $i_c$, $V_a$, $V_b$ and $V_c$ represent the phase currents and the phase-neutral voltages of the machine. The phase currents and the phase voltages at the output of one of the N inverters, denoted by k, are denoted respectively by $i_{ka}$, $i_{kb}$, $i_{kc}$, $V_{ka}$, $V_{kb}$ and $V_{kc}$.

The connection of the inverters in parallel leads, for the phase currents, to:

$$ia = \sum_{k=1}^{n} ika, \quad ib = \sum_{k=1}^{N} ikb, \quad ic = \sum_{k=1}^{N} ikc$$

which can be generally expressed as:

$$iabc = \sum_{k=1}^{N} ikabc;$$

and for the phase-neutral voltages, it can be shown that:

$$Va = \left(\sum_{k=1}^{N} Vka\right) / N, \quad Vb = \left(\sum_{k=1}^{N} Vkb\right) / N, \quad Vc = \left(\sum_{k=1}^{N} Vkc\right) / N$$

which can be generally expressed as:

$$Vabc = \left(\sum_{k=1}^{N} Vkabc\right) / N.$$

In a second known architecture shown in FIG. 2b, the machine comprises multiple sub-machines, each one being supplied with power by a dedicated inverter. The phase currents and phase-neutral voltages of the N inverters are denoted as in the parallel architecture described previously, and as shown in FIG. 2b.

In a known manner, a machine comprising N sub-machines can be modeled by simple machine; the phase currents and phase-neutral voltages then being respectively determined by the following relationships:

$$iabc = \sum_{k=1}^{N} ikabc, \text{ and } Vabc = \left(\sum_{k=1}^{N} Vkabc\right) / N. \quad (i)$$

Both architectures therefore result in the same equations, the equations (i) above. To determine the rotor position of the machine, the position estimator previously described therefore needs to know either:

The phase currents and the phase-neutral voltages at the input of the machine, i.e. $i_a$, $i_b$, $V_a$, $V_b$ and $V_c$, and the rotor position is then calculated by a relationship of the type:

$$(\theta_0, \omega_0) = f(i_a, i_b, i_c, V_a, V_b, V_c)$$

The phase currents and the phase-neutral voltages at the output of each of the N inverters, and the rotor position is then calculated by a relationship of the type:

$$(\theta_0, \omega_0) = f(i_a, i_b, i_c, V_a, V_b, V_c)$$

in which $i_a$, $i_b$, $i_c$, et $V_a$, $V_b$, $V_c$ are defined by the equations (i) reproduced below:

$$iabc = \sum_{k=1}^{N} ikabc, \text{ and } Vabc = \left(\sum_{k=1}^{N} Vkabc\right) / N.$$

In the known solutions, a shared control member generates the phase currents and the phase-neutral voltages for each of the N inverters. In practice, the control member is the element which performs the regulation of current and the generation of duty cycles. It takes the form, for example, of a circuit board with one or more components of the type microcontroller, microprocessor or more simply, programmable logic circuit. The control member has access to the phase current measurements $i_a$, $i_b$, $i_c$, used for the regulation of current, and to the phase-neutral voltages $V_a$, $V_b$, $V_c$, which are deduced from the duty cycles and from the input voltage of the inverter or possibly from voltage sensors at the output of the inverter.

In the known solutions, the control member shared by the N inverters therefore has all the information required for estimating the position. However, this architecture has limits which the present invention seeks to overcome. It actually involves a fixed assignment of the N inverters to the electric machine. The inverter/inverters dedicated, for example, to an electric machine charged with starting up the turbine is only used when the aircraft is on the ground before takeoff. In flight, the unused inverter represents an unwanted mass and unwanted cost. Similarly, a failure of an inverter renders an otherwise operational electric machine unusable. For these reasons, it is desirable to have a more modular electrical architecture, which would allow the assignment of one or more inverters to be modified between multiple electric machines. Following the flight phase of the aircraft, or a particular event such as the breakdown of an inverter, a new assignment of the inverters could be considered.

A modular power bay controlling the power supply of a set of electric machines distributed throughout the aircraft by means of a set of inverters is envisaged. The implementation of such a modular bay encounters, in the case of electric machines without position sensors, difficulties in estimating the position of each one of the electric machines by means of phase currents and phase-neutral voltages, to the extent that the architecture of the inverters charged with shaping the power supply signal of the machine is variable. On the one hand, the position information must be available at the level of each inverter, at high frequency for the phase current regulations; on the other hand, the position estimator must be able to adapt simply to a reassignment of the inverters.

SUMMARY OF THE INVENTION

To this end, the subject of the invention is a modular power bay intended for an aircraft comprising a plurality of electric machines, a plurality of inverters, and a control member configured to assign to at least one machine one or more inverters, according to the operational requirements of each machine of the plurality of machines. The control member comprises, for the at least one machine:

at least one observer, able to measure phase currents and phase-neutral voltages of an electrical power supply signal of said machine, at least one estimator, able to determine a rotor position of said machine, based on the measurements of at least one observer, means for communicating, to the inverter/each of the inverters assigned to said machine, the following data:
  a control instruction for the inverter/each of the inverters making it possible to respond to the operational requirement of said machine,
  measurements of at least one observer, or of the estimated rotor position;

the inverter/each of the inverters being configured to generate an electrical power supply signal for said machine according to the data transmitted.

Advantageously, the at least one estimator determines both the rotor position and a rotor rotational speed of said machine, based on the measurements of at least one observer, by means of a Kalman filter.

Advantageously, the control member comprises, for at least one machine:

a sole observer, measuring the phase currents and phase-neutral voltages of the electrical input signal of said machine, a sole estimator, determining the rotor position based on the measurements of the observer, the means for communicating, transmitting the estimated rotor position to the inverter/each of the inverters assigned to said machine.

Advantageously, the control member comprises, for at least one machine:

an observer associated with the inverter/each of the inverters assigned to said machine, measuring the phase currents and phase-neutral voltages of the electrical output signal of the inverter with which it is associated, a sole estimator, determining the rotor position based on the measurements of the observer of the inverter/each of the inverters assigned to said machine, the means for communicating, transmitting the estimated rotor position to the inverter/each of the inverters assigned to said machine.

Advantageously, the control member comprises, for at least one machine:

an observer associated with the inverter/each of the inverters assigned to said machine, measuring the phase currents and phase-neutral voltages of the electrical output signal of the inverter with which it is associated, an estimator, determining the rotor position based on the measurements of the observer of the inverter/each of the inverters assigned to said machine, the means for communicating, transmitting on the one hand to the estimator the measurements of the observer of the inverter/each of the inverters assigned to said machine, and on the other hand to the inverter/each of the inverters assigned to said machine the rotor position estimated by the estimator.

Advantageously, the means for communicating transmit at high frequency, the measurements of the observer of the inverter/each of the inverters assigned to said machine and a synchronization signal, allowing a synchronized estimation of rotor position.

Advantageously, the control member comprises, for at least one machine:

an observer associated with the inverter/each of the inverters assigned to said machine, measuring the phase currents and phase-neutral voltages of the electrical output signal of the inverter with which it is associated, an estimator associated with the inverter/each of the inverters, determining the rotor position based on the measurements of the observer of the inverter with which it is associated, the means for communicating, transmitting to the inverter/each of the inverters assigned to said machine, the rotor position of the inverter/each of the inverters assigned to said machine.

The estimator of the inverter/each of the inverters determining a corrected rotor position according to the rotor position of the inverter/each of the inverters.

Advantageously, the means for communicating transmit at low frequency, to the inverter/each of the inverters assigned to said machine, the rotor position of the inverter/each of the inverters assigned to said machine, and a synchronization signal to the inverter/each of the inverters, allowing the corrected rotor position to be determined in a synchronized manner.

The invention also concerns an aircraft equipped with a modular power bay having the features previously described.

The invention also concerns a control method intended for an aircraft comprising a plurality of electric machines and a plurality of inverters, the method being characterized in that it comprises steps consisting in:

assigning to at least one machine one or more inverters, according to the operational requirements of each machine of the plurality of machines, for the at least one machine:

measuring phase currents and phase-neutral voltages of at least one electrical power supply signal of said machine, determining a rotor position of said machine, based on the measurements of at least one electrical power supply signal of said machine, transmitting, to the inverter/each of the inverters assigned to said machine, the following information:

a control instruction for the inverter/each of the inverters making it possible to respond to the operational requirement of said machine, the measurements of at least one electrical power supply signal of said machine, or the rotor position;

controlling the inverter/each of the inverters assigned to said machine according to the information transmitted.

BRIEF DESCRIPTION OF THE DRAWINGS

The invention will be better understood and other advantages will become apparent upon reading the detailed description of embodiments given by way of example in the following figures.

DETAILED DESCRIPTION

Figure 1:
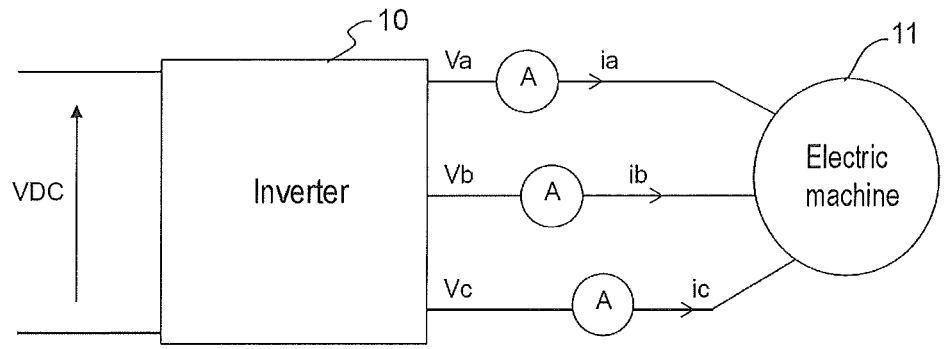
FIG. 1, already introduced, illustrates the known principle of a position estimator of an electric machine supplied with power by an inverter, FIGS. 2a and 2b, already introduced, illustrate the known principle of a position estimator of an electric machine supplied with power by multiple inverters.
Figure 2A:
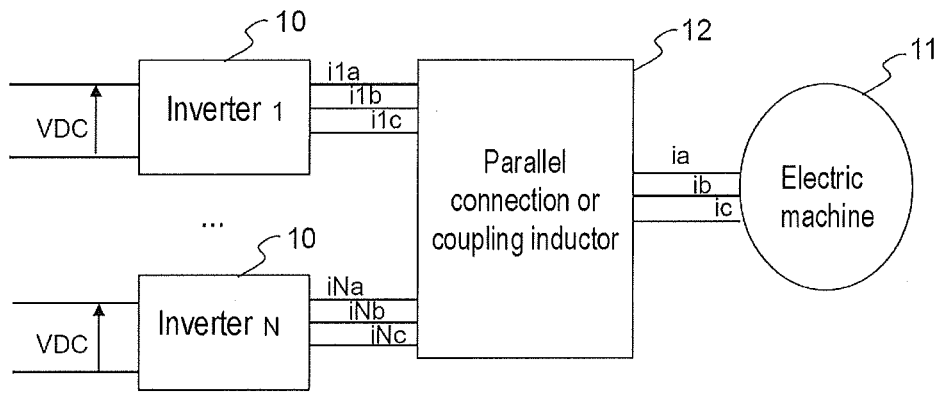
Figure 2B:
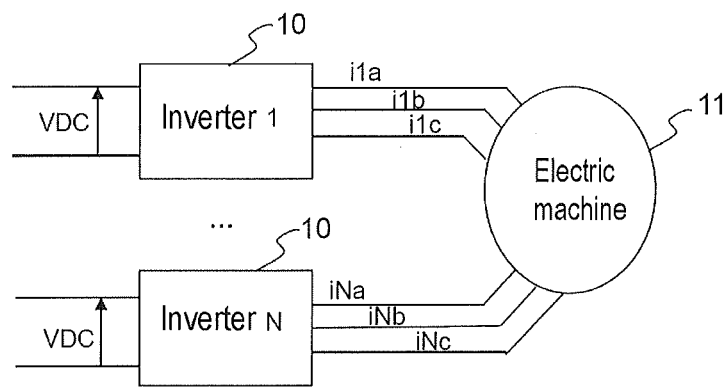
Figure 3:
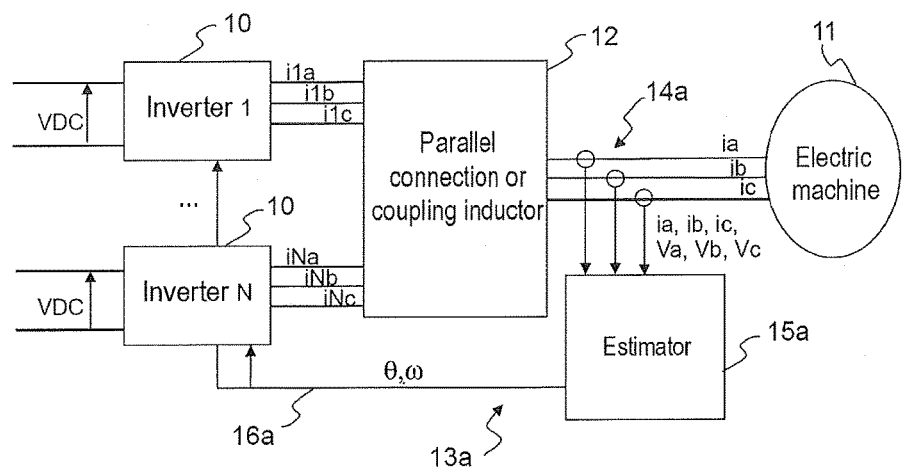
FIG. 3 shows a first embodiment of a modular power bay according to the invention.

FIG. 3 shows a first embodiment of a modular power bay according to the invention. FIG. 3 shows a modular bay having an electric machine and N inverters, to illustrate the principle of the invention in a simplified manner. In effect, the invention concerns a modular bay for controlling the power supply of a set of electric machines distributed throughout the aircraft by means of a set of inverters; the modularity of the bay being obtained by allowing a reassignment of the inverters during utilization of the aircraft, in the flight phase or on the ground. Similarly, certain machines can, under certain conditions of use, be supplied with power by a sole inverter.

Thus, the modular power bay consists of a plurality of electric machines 11, a plurality of inverters 10, and a control member 13 configured to assign to each machine 11, on or more inverters 10, according to the operational requirements of each machine 11.

The control member 13a comprises, for at least one machine:

an observer 14a, measuring the phase currents $i_a$, $i_b$, $i_c$ and phase-neutral voltages $V_a$, $V_b$, $V_c$ of the electrical input signal of said machine, an estimator 15a, determining the rotor position θ based on the measurements $i_a$, $i_b$, $i_c$, $V_a$, $V_b$, $V_c$ of the observer 14a, means for communicating 16a, transmitting the estimated rotor position θ to the inverter/each of the inverters 10 assigned to said machine 11.

In this first embodiment, the electric input signal of the machine in question is implemented, by means of a device 12, commonly referred to as parallel connection or coupling inductor, which ensures the bundling of the electrical power signals of the sub-assembly of inverters assigned to this machine. Advantageously, this device 12 is also modular and may be adapted to a variable number of inverters.

The observer 14a comprises phase current $i_a$, $i_b$, $i_c$ sensors and phase-neutral voltage $V_a$, $V_b$, $V_c$ sensors at the input of the electric machine 11.

The estimator 15a determines both the rotor position θ and a rotor rotational speed ω of the machine 11 in question, based on the measurements $i_a$, $i_b$, $i_c$, $V_a$, $V_b$, $V_c$ of the observer 14a associated with said machine, for example by means of a Kalman filter. As previously described, the equation solved by the estimator is of the type:

$$(\theta,\omega)=f(i_a,i_b,i_c,V_a,V_b,V_c)$$

The control member 13a ensures the control of each electric machine 11 of the bay. The control member can be composed of a common electronic device shared by all of the electric machines, each of the machines having an estimator 14a. The estimators of each of the machines being able to be integrated in the common electronic device or moved into proximity of each of the machines and linked to the common device.

The means for communicating 16a must allow the rotor position θ and the rotor rotational speed ω to be communicated to each of the inverters eligible to be assigned to the machine in question. Advantageously, the means for communicating 16a link the control member to each of the inverters of the bay, and transmit to each inverter the information on the position and speed of the machine to which it is assigned.

Figure 4:
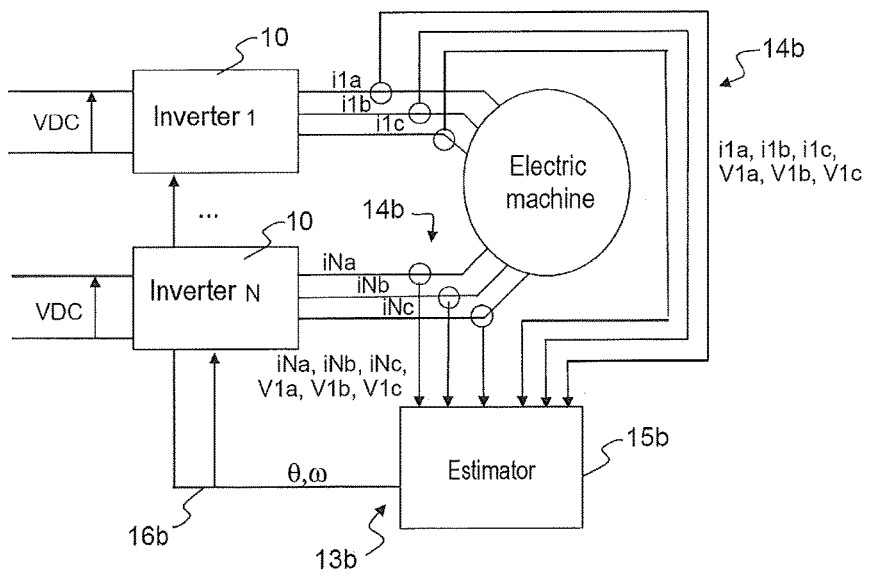
FIG. 4 shows a second embodiment of a modular power bay according to the invention.

FIG. 4 shows a second embodiment of a modular power bay according to the invention. In this second embodiment, one of the electric machines of the modular bay is composed of multiple sub-machines, each supplied with power by an inverter. The control member 13b of the modular bay thus comprises, for this machine:

observers 14b associated with the inverter/each of the inverters 10 assigned to this machine, measuring the phase currents $i_a$, $i_b$, $i_c$ and phase-neutral voltages $V_a$, $V_b$, $V_c$ of the electrical output signal of the inverter with which it is associated, an estimator 15b, determining the rotor position θ and the rotor rotational speed ω based on the measurements of the observer 14b of the inverter/each of the inverters 10 assigned to said machine, the means for communicating 16b, transmitting the rotor position θ and the rotor rotational speed ω to the inverter/each of the inverters 10.

This second embodiment does not implement a parallel connection device, the electric power signals of the inverters supplying power directly to the electric machine.

The observer 14b comprises phase current $i_a$, $i_b$, $i_c$, sensors and phase-neutral voltage $V_a$, $V_b$, $V_c$ sensors at the output of each of the inverters 10 assigned to the machine.

The estimator 15b determines both the rotor position θ and a rotor rotational speed ω of the machine 11 in question, based on the measurements $i_a$, $i_b$, $i_c$, $V_a$, $V_b$, $V_c$ of the observer 14 associated with said machine, for example by means of a Kalman filter. As previously described, the equation solved by the estimator is then of the type:

$$(\theta,\omega)=f(i_a,i_b,i_c,V_a,V_b,V_c)$$

in which $i_a$, $i_b$, $i_c$ and $V_a$, $V_b$, $V_c$ are defined by the equations:

$$iabc = \sum_{k=1}^{N} ikabc, \text{ and } Vabc = \left(\sum_{k=1}^{N} Vkabc\right)\bigg/N.$$

The control member 13b can be composed of a common electronic device shared by all of the electric machines, each of the machines having an estimator 14a being able to be integrated in the common electronic device or moved into proximity of each of the inverters and linked to the common device. The means for communicating 16b link the control member 13b to each of the inverters 10 of the bay, and transmit to each inverter the information on the position and speed of the machine to which it is assigned.

Advantageously, the first and second embodiments can be combined within one and the same bay. Certain electric machines can have a device 12 for the parallel connection of electrical power signals of a variable number of inverters, and other machines can comprise multiple sub-machines which can be supplied with power by multiple inverters, the number of which can also vary during use.

Figure 5:
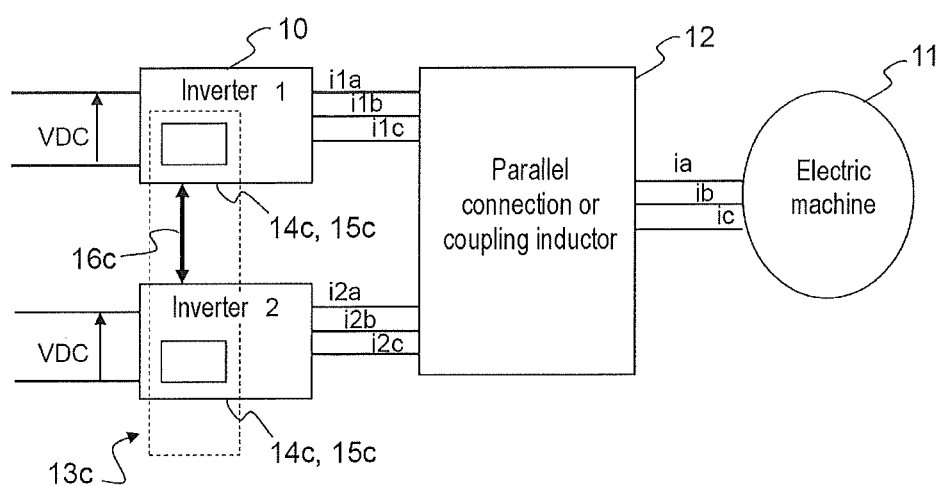
FIG. 5 shows a third embodiment of a modular power bay according to the invention.

FIG. 5 shows a third embodiment of a modular power bay according to the invention. The modular bay comprises a plurality of machines and a control member 13c capable of assigning one or more inverters to each of the machines according to the operational requirements of the aircraft. A machine of the bay shown in FIG. 5 comprises a device 12 for the parallel connection of the electrical power signals of N inverters.

In this embodiment, the control member 13c is not centralized in a common electronic device, but moved into each of the inverters of the electronic bay. Each inverter assigned to a machine thus comprises one current and voltage observer 14c, and one estimator 15c.

In reality, this embodiment comprises two variants which can be illustrated by the same FIG. 5. In the first variant, the inverters are linked by a communication bus, i.e. the means for communicating 16c of the control member 13c, so that they share the measurements of the estimators 15c of each of the inverters. The estimator 15c of each of the inverters, or advantageously of at least one of them, therefore determines the position and speed of the machine using a relationship of the type:

$$(\theta, \omega) = f(i_a, i_b, i_c, V_a, V_b, V_c) \text{ with}$$

$$iabc = \sum_{k=1}^{N} ikabc, \text{ et } Vabc = \left(\sum_{k=1}^{N} Vkabc\right)\bigg/N.$$

This solution requires a high-speed communication bus as the estimator is generally executed at the calculating frequency of the current loop, that generally being the frequency of the PWM duty cycles, or even twice that frequency. The observers 14c therefore send their information on the current and voltage via the means for communicating 16c, at this high frequency.

Figure 6:
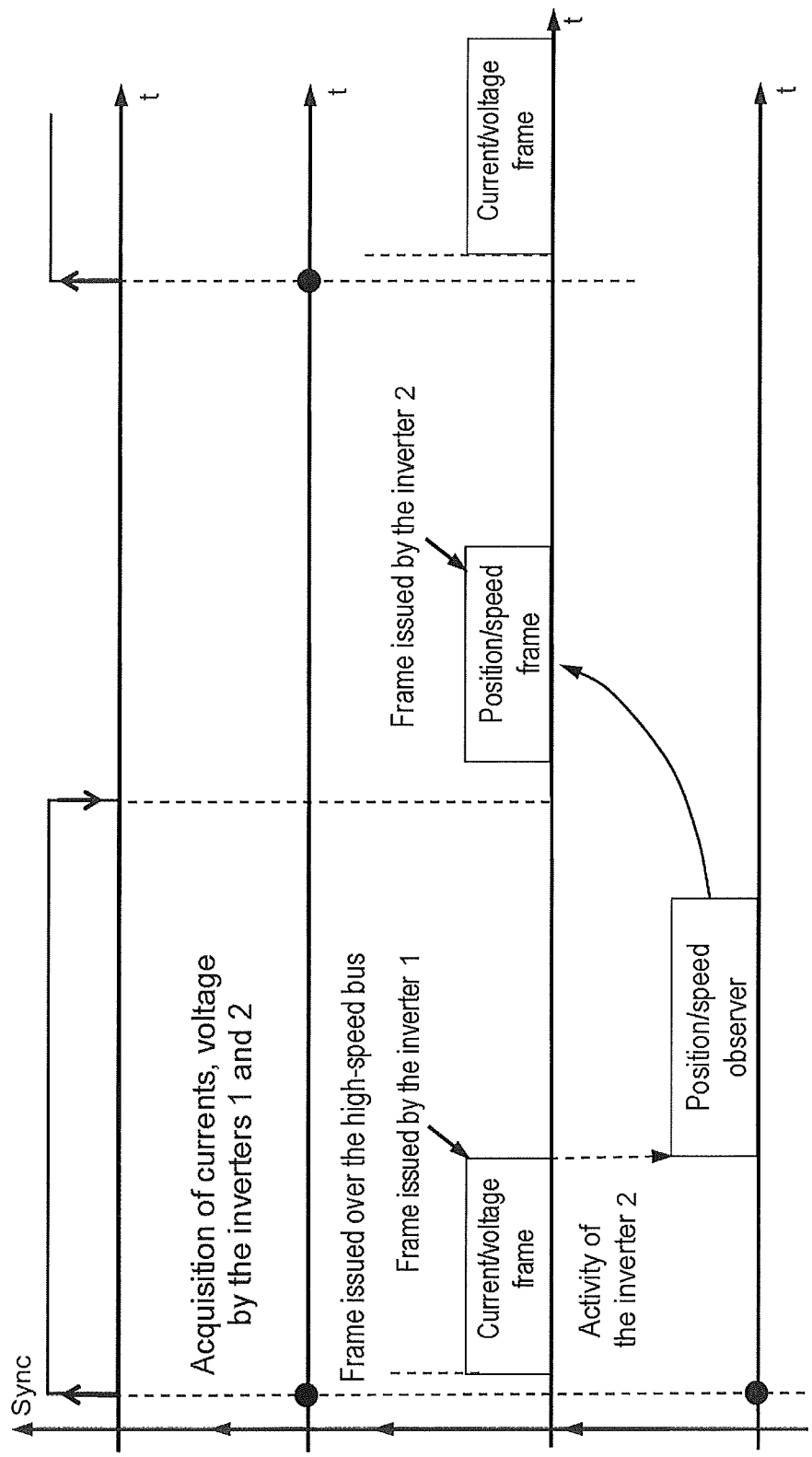
FIG. 6 illustrates the operation of a modular power bay according to the third embodiment, For the sake of clarity, the same elements will be given the same references in the various figures.

FIG. 6 illustrates the operation of a modular power bay according to this first variant of the third embodiment. The estimators 15c of each of the inverters 10 (the figure illustrates the case of two inverters) synchronize on a shared event of the type rising edge or falling edge of a synchronization signal, or receipt of a specific frame over the communication bus. This allows the totality of the current and voltage measurements of the observers 14c to be synchronized, and therefore the error regarding the estimated position to be limited.

In the first chronogram, at the top of the figure, a synchronization frame is shown. The acquisition of measurements of the observers 14c of the two inverters is carried out on a rising edge of this frame, illustrated by the second chronogram. Each of the observers then transmits its measurement over the communication bus as illustrated by the third chronogram. The measurements of each of the observers are then received by the estimator 15c of each of the inverters, which determines the position and speed of the machine, as illustrated in the fourth chronogram.

As has been mentioned, it is advantageous, in this first variant, to limit the calculation of position and speed to a sole inverter. The result of the calculation is then transmitted to the other inverters by means of the communication bus. This is the case selected in FIG. 6, the information on the position and speed of the machine, determined by the second inverter, is used directly by this inverter for its control, and is also transmitted via the communication bus to the first inverter, as shown in the third chronogram.

Synchronization can be carried out via a digital signal such as a clock. The frequency of this clock must be sufficient to allow the regular readjustment of the internal clocks of the inverters. Typically, a clock frequency equal to the frequency of the duty cycles of the inverters will be retained, for example 10 kHz. Synchronization between the inverters can also be carried out by using a predefined frame of a communication bus between the inverters.

By way of illustration, for duty cycles of the two inverters with frequency equal to 20 kHz, and data encoded with 16 bits, the usable bandwidth over the communication bus is:
for the transmission of the measurements: 3 currents+3 voltages→96 bits*20 kHz=1.92 Mbits/s
for the transmission of the position and the speed: 1 position+1 speed→32 bits*20 kHz=0.64 Mbits/s
i.e. a usable bandwidth of 2.56 Mbits/s.

In the second variant, also illustrated by FIG. 5, the estimators 15c of each of the inverters 10 determine a position and a speed solely on the basis of measurements of currents and voltages of the observer 14c associated with this inverter, which considering that the other inverters generate the same electrical power signals as it does, i.e. the same PWM duty cycles. Typically, the estimator of the inverter denoted by 1 determines a rotor position $\theta_1$ and a rotor speed $\omega_1$ by means of the relationship:

$$(\theta_1, \omega_1) = f(i_a, i_b, i_c, V_a, V_b, V_c),$$

in which $$Vabc = \left(\sum_{k=1}^{N} V1kabc\right)/N = V1abc, \text{ and } iabc = N*i1abc.$$

Similarly, the estimator of the inverter denoted by k determines a rotor position $\theta_k$ and a rotor speed $\omega_k$ by means of the relationship:

$$(\theta_0, \omega_0) = f(i_a, i_b, i_c, V_a, V_b, V_c), \text{ with } V_{abc} = V_{kabc},$$
$$\text{and } i_{abc} = N*i_{kabc}$$

Each inverter k thus has information on the position $\theta_k$ and speed $\omega_k$, which it transmits to the N other inverters using the means for communicating. This information can be exchanged at low frequency, for example the calculating frequency of the speed loop. A low-speed communication bus can advantageously be retained in the case of this second variant.

Next, the estimator of each of the inverters which have positions and speeds determined by the totality of the N inverters, determine a corrected rotor position and a corrected rotor speed, according to the information on positions and speeds received from each of the inverters.

An envisaged solution is to determine, within each inverter, a corrected position $\theta_{corr}$ and a corrected speed $\omega_{corr}$ as the average of the positions and speeds of the totality of the inverters. Stated another way:

$$\theta_{corr} = \left(\sum_{i=1}^{N} \theta_i\right)/N, \text{ and } \omega_{corr} = \left(\sum_{i=1}^{N} \omega_i\right)/N$$

Advantageously, the estimators of each of the inverters synchronize on a shared event of the type rising edge or falling edge of a synchronization signal, or receipt of a specific frame over the communication bus. The information exchanged on position and speed corresponding advantageously to one and the same perfectly defined instant for each of the inverters.

It should be recalled that FIGS. 3 to 5 only show a single electric machine supplied with power by N inverters, but the invention concerns a modular bay comprising a plurality of electric machines. To this end, the control member is configured to assign to each machine one or more inverters, according to the operational requirements of each machine of the plurality of machines. The simplified representation in FIGS. 3 to 5 allows a difficulty overcome by the present invention to be illustrated, that of the management of the estimation of position of each of the electric machines without position sensors, and thus by means of the phase currents and phase-neutral voltages, in order to allow a modular architecture of the power-supply inverters of the electric machines.

The various embodiments and variants which have been described present distinct advantages and disadvantages. For example, the first embodiment is relatively simple to implement but has the disadvantage of requiring the addition of dedicated electronics and a certain number of supplementary voltage and current sensors. The first variant of the third embodiment advantageously allows greater precision in the estimation of position while limiting the additional cost in terms of sensors, as it makes use of information on currents and voltage available at the level of the inverter. But in order to do this, this architecture requires a high-speed communication bus to be implemented between each of the inverters or between some of the inverter sub-assemblies of the bay.

Nevertheless, all of the solutions proposed by the present invention have in common that they provide a solution to the problem of the modularity of the assignment of the inverters for controlling a set of electric machines of an aircraft. The modular bays according to the invention thus have in common a plurality of electric machines 11, a plurality of inverters 10, and a control member, 13a, or 13b or 13c, configured to assign to at least one machine 11 one or more inverters 10, according to the operational requirements of each machine 11 of the plurality of machines 11, characterized in that the control member comprises, for the at least one machine 11:

at least one observer, able to measure phase currents $i_a$, $i_b$, $i_c$ and phase-neutral voltages $V_a$, $V_b$, $V_c$ of an electrical power supply signal of said machine 11, at least one estimator, able to determine a rotor position θ of said machine 11, based on the measurements of at least one observer, means for communicating, to the inverter/each of the inverters 10 assigned to said machine 11, the following data:

a control instruction for the inverter/each of the inverters 10 making it possible to respond to the operational requirement of said machine 11, measurements of at least one observer, or of the estimated rotor position θ, the inverter/each of the inverters 10 being configured to generate an electrical power supply signal for said machine 11 according to the data transmitted.

The invention also concerns a control method intended for an aircraft comprising a plurality of electric machines 11 and a plurality of inverters 10, the method being characterized in that it comprises steps consisting in:

assigning to at least one machine 11 one or more inverters 10, according to the operational requirements of each machine 11 of the plurality of machines 11, for the at least one machine 11:

measuring phase currents $i_a$, $i_b$, $i_c$ and phase-neutral voltages $V_a$, $V_b$, $V_c$, of at least one electrical power supply signal of said machine 11, determining a rotor position θ of said machine, based on the measurements $i_a$, $i_b$, $i_c$, $V_a$, $V_b$, $V_c$ at least one electrical power supply signal of said machine 11, transmitting, to the inverter/each of the inverters 10 assigned to said machine 11, the following information:

a control instruction for the inverter/each of the inverters 10 making it possible to respond to the operational requirement of said machine 11, the measurements $i_a$, $i_b$, $i_c$, $V_a$, $V_b$, $V_c$ at least one electrical power supply signal of said machine 11, or the rotor position θ, controlling the inverter/each of the inverters 10 assigned to said machine 11 according to the information transmitted.

The invention claimed is:

1. A modular power bay for an aircraft comprising a plurality of electric machines, inverters, and a control member being configured to be able to assign a plurality of said inverters to a first machine of the plurality of electric machines, wherein the control member comprises:

proper observers to measure phase currents and phase-neutral voltages of electrical power supply signals of said first machine, each of said proper observers being assigned to one of the inverters assigned to the first machine, and proper estimators to determine at least one estimated rotor position of said first machine, each proper estimator being assigned to one of the inverters assigned to the first machine, based on the measurements of the proper observers, means of communication:

for communicating a control instruction for each of the inverters assigned to said first machine by the control member, for communicating the estimated rotor position, the means of communication being configured such that each of the inverters being assigned to the first machine has each estimated rotor position of said first machine and each inverter assigned to the first machine being configured to use the control instruction and the estimated rotor position of said first machine to generate an electrical power supply signal for said first machine.

2. The modular power bay as claimed in claim 1, wherein at least one proper estimator determines both the estimated rotor position and a rotor rotational speed of said first machine, based on the measurements of the at least one observer, by means of a Kalman filter.

3. The modular power bay as claimed in claim 1, wherein:

each of the proper observers measuring phase currents and phase-neutral voltages of an electrical output signal of the inverter to which the proper observer is assigned, a first proper estimator of the proper estimators determining an estimated rotor position based on measurements of the proper observers, and the means of communication being configured to transmit to the first proper estimator the measurements of phase currents and of phase-neutral voltages of each proper observer, and to transmit to each of the inverters assigned to said first machine, the estimated rotor position determined by the first proper estimator.

4. The modular power bay as claimed in claim 3, wherein the means of communication is configured to transmit at a high frequency, the measurements of the proper observers and a synchronization signal to the first proper estimator for determining a synchronized estimation of rotor position.

5. The modular power bay as claimed in claim 3, wherein each of the proper observers and each of the proper estimators is implemented in the inverter.

6. The modular power bay as claimed in claim 1, wherein:

each of the proper observers measuring phase currents and phase-neutral voltages of an electrical output signal of the inverter to which the proposer observer is assigned, each of the proper estimators determining the estimated rotor position based on measurements of phase current and phase-neutral voltage measured by the proper observer assigned to the inverter, the means of communication being configured to transmit, to each of the proper estimators, the estimated rotor position determined by each of the proper estimators, and each of the proper estimators determining a corrected rotor position using the estimated rotor position determined by each of the proper estimators.

7. The modular power bay as claimed in claim 6, wherein the means of communication is configured to transmit at a low frequency, to each of the proper estimators, the estimated rotor position determined by each of the other proper estimators and a synchronization signal to each of the proper estimators to determine a corrected rotor position in a synchronized manner.

8. An aircraft equipped with a modular power bay as claimed in claim 1.

9. The modular power bay as claimed in claim 1, wherein each of the proper observers measuring phase currents and phase-neutral voltages of an electrical output signal of the inverter to which said proper observer is assigned.

10. A control method for an aircraft comprising a plurality of electric machines, the method comprising:

assigning a plurality of inverters to a first machine of the plurality of electric machines, for the first machine:

measuring phase currents and phase-neutral voltages of electrical power supply signals of said first machine, by different proper observers, each proper observer being assigned to one of the plurality of inverters assigned to the first machine, determining, by proper estimators, at least an estimated rotor position of said first machine, based on the measurements of phase currents and phase-neutral voltages, based on the measurements of the proper observers, each proper estimator being assigned to one of the inverters assigned to the first machine, transmitting, to each of the inverters assigned to said first machine, the following information:
   a control instruction for the assigned inverter, and
   the estimated rotor position, such that each of the proper estimators has each estimated rotor position of said first machine, each inverter assigned to the first machine using the control instruction and the estimated rotor position of said first machine to generate an electrical power supply signal for said first machine.

11. The control method as claimed in claim 10, wherein each of the proper observers measuring phase currents and phase-neutral voltages of an electrical output signal of the inverter to which said proper observer is assigned.

* * * * *